March 14, 1967  F. G. HEIMANN  3,308,738
VENTILATING RIB PANELS
Filed Dec. 28, 1964  3 Sheets-Sheet 1
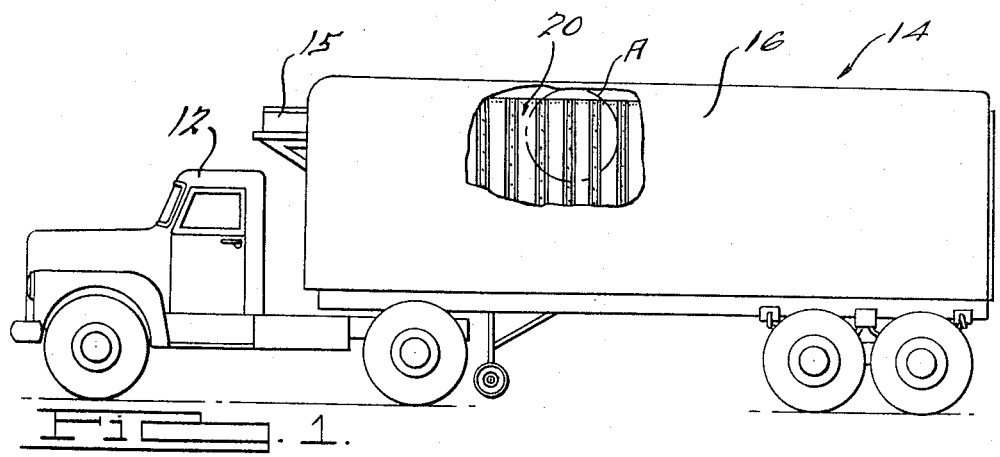
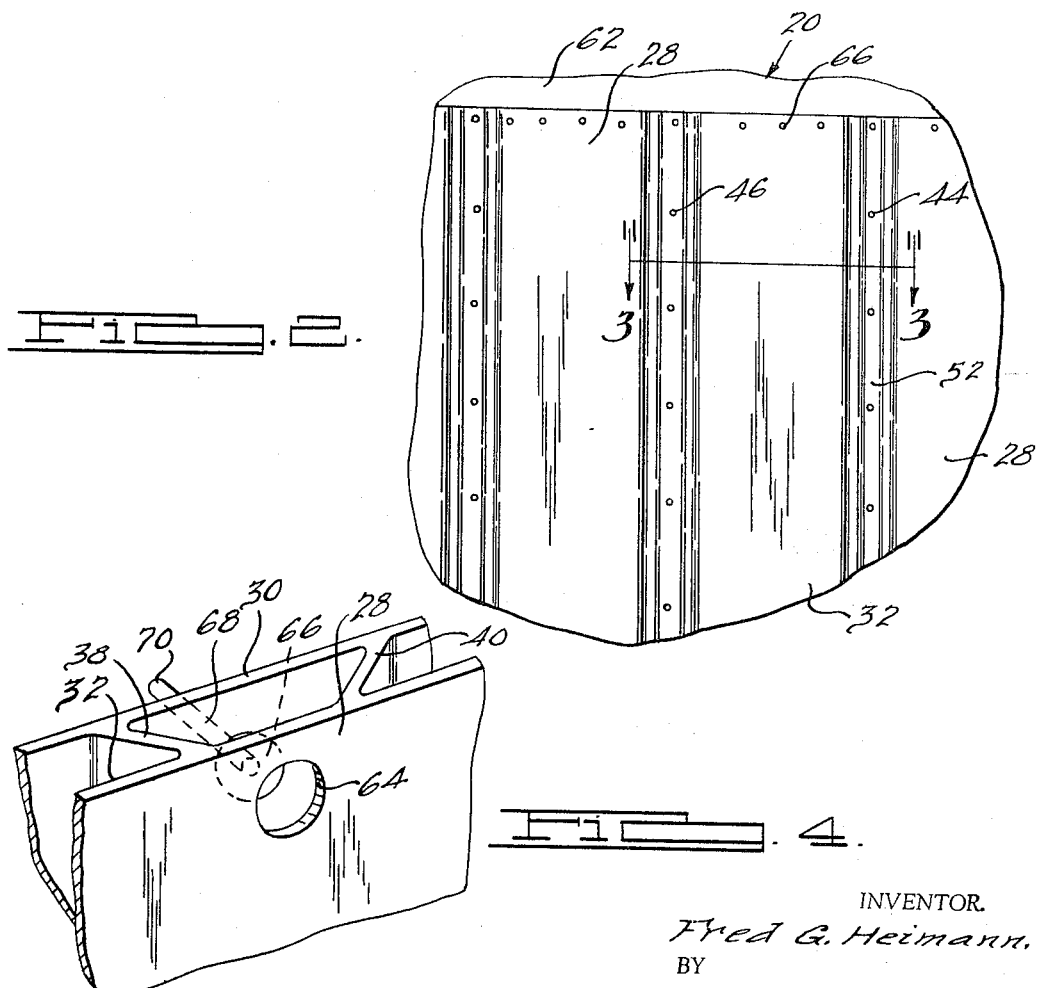
INVENTOR.
Fred G. Heimann,
BY
Harness, Dickey & Pierce
ATTORNEYS.

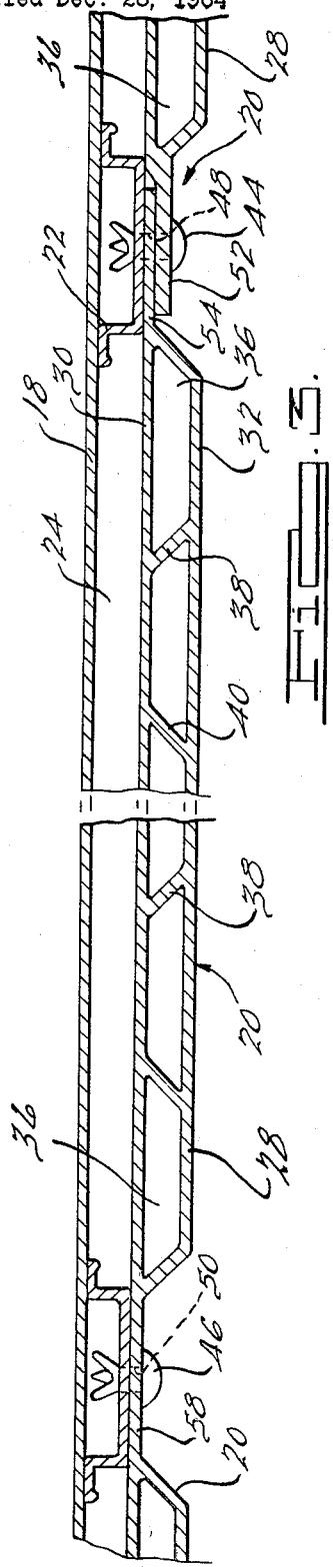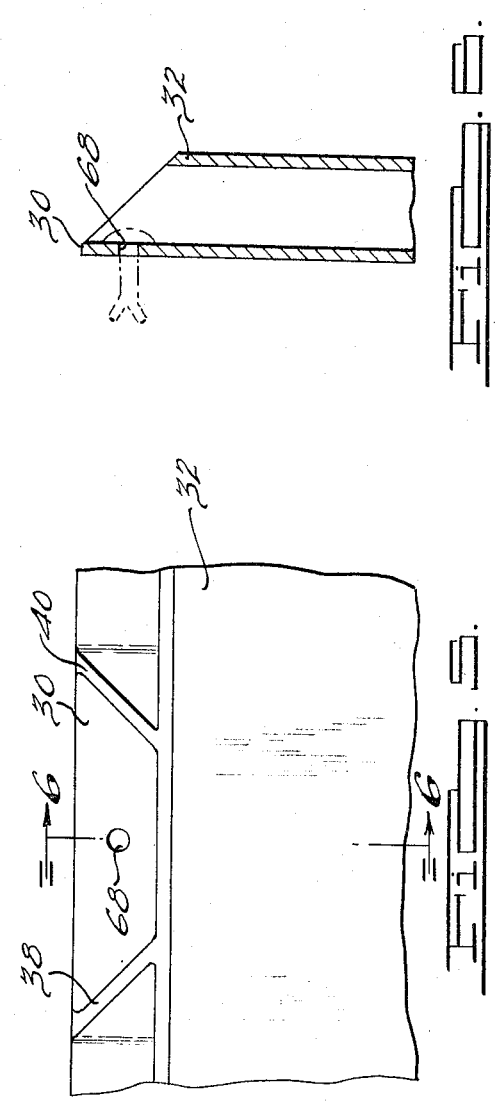

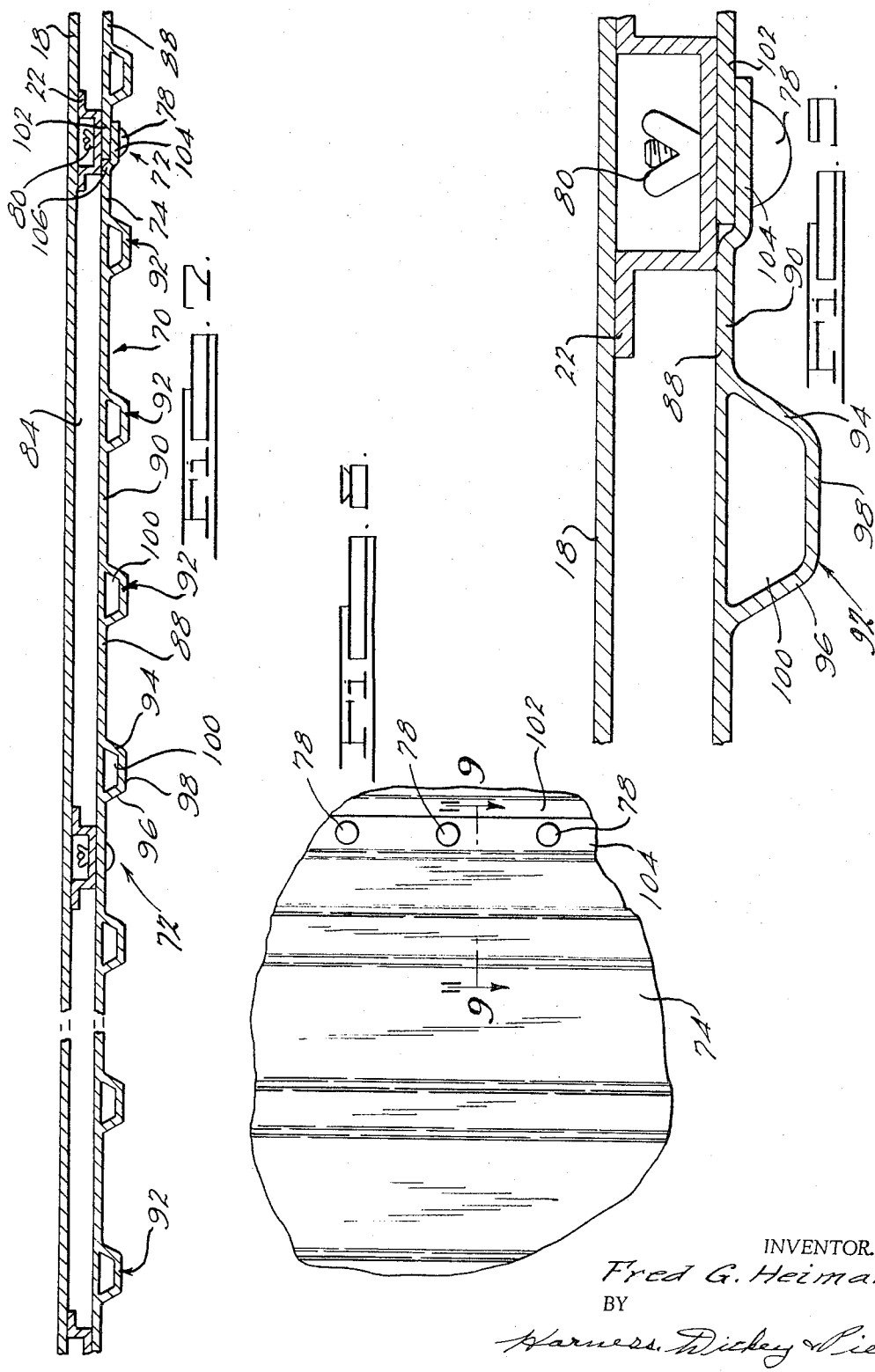

United States Patent Office 3,308,738
Patented Mar. 14, 1967

3,308,738
VENTILATING RIB PANELS
Fred G. Heimann, Mount Clemens, Mich., assignor to Fruehauf Corporation, Detroit, Mich., a corporation of Michigan
Filed Dec. 28, 1964, Ser. No. 421,508
7 Claims. (Cl. 98—6)

This invention relates generally to interior panels for a vehicle, and more specifically, to interior panels which are particularly adaptable for lining the interior of a refrigerated vehicle such as heavy duty over-the-road trailers, and the like.

In refrigerated trucks, trailers, railroad cars, or the like, it is necessary and desirable that the refrigerated air be directed along the sides of the payload as well as across the top. In this manner the entire payload is maintained in a refrigerated condition, the temperature within the interior of the trailer or car is stabilized avoiding unwanted temperature gradients and the most effective flow of air is achieved. Certain prior art constructions are designed to achieve the aforementioned desired results but the resulting structure is expensive to construct, involves structures which reduced the payload cube of the interior of the vehicle and are not adapted to certain configurations of load containers.

For example, one such construction involved the use of urethane foam which is in immediate contact with the outside wall construction and the interior surface thereof is covered with aluminized kraft paper. The interior liner panels are installed at least ½ inch away from the kraft paper with batting material placed at approximate 18 inch intervals in the area of the vertical posts of the exterior wall construction for spacing purposes. Cold air is then allowed to enter this ½ inch wall space from the bottom thereof and is directed through the space and up to the top where it exits through appropriate openings.

It is seen that a construction of this type, while serving to direct cold air between the source of heat, the exterior wall, and the cargo, is relatively expensive to construct and the interior panels are relatively poorly supported. Also, the panels do not contain the necessary cold air ducts positioned adjacent the payload for purposes of temperature stability. In the construction described, the cold air ducts are between the kraft paper and the panel, precluding direct contact of the air with the cargo.

In certain other prior art constructions, a panel is suitably fastened to the exterior wall construction of the trailer and ribs are formed on the inwardly facing surface of the panels as by fastening lumber to the flat panel or molding the lumber into a panel fabricated of a plastic material. In this type of construction the insulating foam is generally formed between the exterior wall construction and the flat panel described above. In this instance, the presence of the ribs constructed in the foregoing manner sharply reduces the cross-sectional area of the air passageways formed between the flat panel and the payload cartons. Also, a further problem in the above described prior art rib occurs when the cargo is in a sack form, such as may be found in trailers hauling potatoes and like goods. In this situation, the cargo sacks would block off the effective air flow between the ribs by occupying the space between the ribs. Thus, a condition is created of an undesirable temperature gradient adjacent the blocked portion of the passageway.

The instant invention is calculated to alleviate or sharply reduce these problems in its novel unitary construction of the interior lining panels. As will be seen as the description proceeds, the panels of the instant invention contain within themselves the necessary cold air ducts to provide a uniform flow of air throughout all sides of the cargo adjacent the wall or ceiling construction. The panels of the instant invention are preferably formed of extruded plastic members which are suitably fastened together and attached to the vertical post of the exterior trailer wall construction. In this way the construction of the interior wall is simple, inexpensive and strong in use.

Accordingly, it is one object of the present invention to provide an improved interior wall construction.

It is another object of the present invention to provide an improved wall construction for use in the interior of refrigerated trailers or other types of vehicles.

Another object of the present invention is to provide an interior wall construction for a refrigerated trailer wherein cold air ducts are formed both interior of the panel and also immediately adjacent the payload.

It is a further object of the present invention to provide an interior panel construction for a refrigerated trailer which increases the air flow capability over prior art constructions.

It is still a further object of the present invention to provide an interior panel construction for refrigerated trailers wherein the ribs may be closely spaced so that irregular shaped payload containers will not constrict the air flow.

A still further object of the present invention is to provide an interior panel which is constructed to decrease the amount of insulating foam required over prior art constructions.

It is still another object of the present invention to provide an interior panel construction which is inexpensive to manufacture and simple to install.

It is still another object of the present invention to provide an interior panel construction of the type described which is strong in use yet maintaining a thin profile in cross section.

Further objects, features and advantages of this invention will become apparent from a consideration of the following description, the appended claims and the accompanying drawings in which:

FIGURE 1 is a side view of a tractor-trailer combination with a portion of a trailer cut away to illustrate the interior lining panels embodying certain principles of the present invention;

FIG. 2 is an exploded view of the section of the interior panel of FIG. 1 illustrated in circle A thereof;

FIG. 3 is a cross-sectional view of the panel construction of FIG. 2 taken along line 3—3 thereof;

FIG. 4 is a perspective view of the panel construction of FIG. 1 illustrating one method of fastening the panel to the vertical posts of the exterior wall construction of the trailer;

FIG. 5 is an elevation view of a portion of the panel construction of FIG. 1 illustrating a modified method of fastening the panel to the vertical ribs of the exterior wall construction of the trailer;

FIG. 6 is a sectional view of the panel of FIG. 5 taken along line 6—6 thereof;

FIG. 7 is a sectional view of a modification of the interior panel construction of FIG. 1 illustrating certain other features of the present invention;

FIG. 8 is an elevation view of the modified panel construction of FIG. 7; and

FIG. 9 is an exploded plan view of the interior panel construction of FIG. 8 taken along line 9—9 thereof illustrating the cold air ducts and the method of overlapping adjacent panels.

Referring now to the drawings, and particularly to FIGS. 1 to 3, there is illustrated a tractor 12 and a trailer 14 combination which is suitably refrigerated by an air refrigerating unit 15. The tractor-trailer combination 12, 14 is of the conventional refrigerated type wherein the trailer 14 has side walls 16 which are provided with an outer skin 18 and a set of interior liner panels 20 which are formed to incorporate certain principles of the present invention. As is the common practice, a plurality of vertically disposed posts 22 are attached to the outer wall skin 18 by welding or the like which serve as means for attaching the interior lining panels 20 to the trailer walls 16 and also serve to rigidize the side walls 16. A space 24 is formed between the outer skin 18 and the inner lining walls 20 which may be foamed in situ or sheets of foam placed therein for insulating purposes, as is well known in the art.

As is seen particularly in FIG. 3, the inner liner wall 20 is fabricated of a plurality of panels 28 which are preferably formed of extruded Fiberglas reinforced polyester plastic but may be formed of any suitable structural material which may be extruded or molded. With the advent of certain extruding techniques, it is possible to extrude the panels thereby making the liner assembly simple and inexpensive to construct. The exterior surface of the panel is preferably formed relatively smoothly without the use of surfacing gel-coat.

As is particularly seen in FIG. 3, the panel 28 is formed of an outer wall member 30 and an inner wall member 32 spaced therefrom, defining a duct 36 therebetween. A plurality of suitable reinforcing struts 38 and 40 are connected between the outer wall member 30 and inner wall member 32 to provide additional rigidity to the panel 28 and divide the duct 36 into a plurality of relatively smaller passageways. As is seen, the strut members 38 and 40 are disposed at angles relative to each other to give the passageways 36 the general configuration of a trapezoid, an extremely strong structural geometry.

The wall panels 28 are fastened to the post 22 by means of fastener assemblies 44, 46 which pass through apertures 48 and 50 formed in panel members 28. The side edges of the panels 28 are provided with overlapping flanges 52, 54 and it is seen that the flange 52 is offset from the outer surface of the wall member 30 thereby allowing the flange 54 to be fitted between the post 22 and the flange 52. In this way a relatively smooth outer surface is presented to the vertically disposed post 22 for fastening purposes. A plurality of recessed portions 58 are formed intermediate the ends 52, 54 of the panels 28 to provide additional fastening portions for the panel 28. The number and spacing of these portions 58 are determined by the width of the panel 28 and the structural rigidity of the complete inner wall lining which is desired.

From the view illustrated in FIG. 3, it is seen that the panels 28 form an extremely rigid structure while maintaining a slim profile, thereby increasing the allowable load cube within the trailer. The space 24 may be suitably foamed with a plurality of known foaming materials after the panel has been installed. With the continuous and smooth surface presented to the area 24, it is seen that the panels 28 may be easily removed should one become damaged or otherwise unusable. The ducts 36 described are connected to the ceiling eaves constructed in the trailer and provide a smooth and high volume flow of cold air between the floor and ceiling of the trailer.

The upper portion of the panel 28 is fastened to a ceiling member 62, which may take the form of an L-shaped channel with one leg generally aligned with the ceiling and the other leg generally parallel to the outer wall member 18. FIG. 4 illustrates one preferred method of fastening the upper portions of the panels to the member 62 wherein an aperture is formed in the inner wall member 32 to permit a head 66 of a fastening means 68 to pass therethrough and abut the outer wall 30 of the panel member 28. The shaft 70 enters the post members 22 and a suitable nut or, in the case of a rivet, the backing portion is fastened onto the shaft 70. A series of these fastening means 68 are provided along the upper and lower edges of the panel member 28.

An alternate method of fastening the panel 28 is illustrated in FIGS. 5 and 6 wherein the upper and lower edges of the inner wall member 32 are cut away at an angle with the horizontal to form an open area in front of a portion of the outer wall 30 thereby exposing the fastener 68 therein. In this way the assembly of the panels 28 to the posts 22 is facilitated and the user, during the assembly, is not encumbered in his movements. This alternate method of assembling the upper and lower portion of the panel to the frame members 62 also opens the upper and lower portions of the passageways 36 to the freer flow of air, thereby enhancing the cooling characteristics of the panel members 28.

Referring now to FIGS. 7, 8 and 9, there is illustrated an alternative embodiment of the panel members illustrated in FIGS. 1 to 6. A liner assembly 70 is illustrated as being attached to the outer skin 18 by means of a set of fasteners 72 which suitably attach the liner assembly 70 to the posts 22 as described in conjunction with FIGS. 1 to 7. The fastener 72 may be of the rivet type or a bolt 78 and wing nut 80. As in the embodiment described above, a space 84 is provided between the outer skin 18 and panel member 70 to provide an area for the installation of a foamed material, thus insulating the outer skin 18 from the interior of the trailer.

The panel assembly 70 comprises a plurality of panels 88 which are preferably formed of an extruded Fiberglas reinforced polyester plastic, as in the embodiment described above. The panels 88 comprise a continuous backing member 90 having a plurality of closely spaced duct members 92 formed on and integral with an outer surface thereof. The duct members 92 are seen to be relatively closely spaced for structural rigidity and also to provide relatively small passageways between the duct members 92. In this way the spaces between ducts 92 may be kept free of the cargo in the case where the cargo consists of relatively small cartons, crates or sacks of material. If the duct members 92 were widely spaced, the cargo could position itself between duct members 92 thereby cutting off the air passageway and providing areas of a high temperature gradient, an undesirable condition.

It is seen that the duct members 92 are formed with a pair of inwardly converging side members 94 and 96 with a flat connecting member 98 to form a generally trapezoidal duct 100 therein. In this way the ducts are extremely rigid and also furnish additional rigidity to the panel member. The ducts 100 provide a path for the flow of cooling air and thus flows air between the outer skin and the cargo contained within the trailer.

The edges of the panel are formed with a pair of flanges 102, 104, wherein flange 104 is formed with an offset at 106 to provide clearance wherein flange 102 may be interfitted between post 22 and flange 104. This configuration is similar to that described in conjunction with FIGS. 1 to 6, and similarly, the panel presents a relatively smooth backing surface to the space 84.

The upper and lower edges of the panels 74 are provided with apertures which are spaced between the duct members 92 to receive fasteners and rigidly secure the panels to the upper and lower structural members as described in conjunction with FIGS. 1 to 6. It is seen that the details of modifying the panels 28 at their upper and lower edges illustrated in FIGS. 4 to 6 are not necessary in this particular embodiment of the panels as the fasteners may be provided between the duct members 92 on the flat surface therebetween.

From the foregoing it should be apparent that the instant invention results in a wall panel that is double wall thereby having high strength to resist foam pressure load impacts. The double wall forms air passages for counter flow cooling, i.e. puts cold air at floor level at the same time heat is being removed from side wall insulation. The construction allows the use of minimum thickness side wall insulation and gives high cube capability without increasing heat gain of cargo adjacent to the wall. The cooling medium is interspersed between the heat source (outside wall) and the interior cargo area. This panel ties in with the air ducts installed along trailer eaves.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A panel liner assembly for use in lining the exterior of a ventilated vehicle having a cargo disposed therein for transportation and an outer skin enclosing said cargo, said liner assembly comprising;
   a plurality of extruded panels having an outer backing wall and means integral therewith forming a plurality of parallel air ducts on a surface of said backing wall for directing a cooling fluid between the floor and ceiling of the vehicle,
   said duct forming means having a pair of converging side members and means connecting said side members forming a generally trapezoidal duct,
   said duct forming means including an open space disposed therebetween and being disposed generally vertically and inwardly of the outer skin and coacting with the cargo to form ducts for directing cooling fluid between the floor and ceiling of the vehicle,
   means formed on said panels for interconnecting said panels, one with the other, and
   fastener means connecting said interconnecting means of adjacent panels including means supporting said plurality of panels relative to the outer skin.

2. The panel liner assembly of claim 1 wherein said inner wall has means forming an aperture therein at an upper edge thereof for receiving said fastener means in said duct.

3. A panel liner assembly for use in lining the exterior of a ventilated vehicle having an outer skin comprising;
   a plurality of panels formed of an extruded material interconnected at outer edges thereof,
   each of said plurality of panels having an inner wall and an outer wall spaced therefrom forming a duct therebetween for directing a cooling fluid between the ceiling and floor of the vehicle,
   rib means integrally formed with said inner and outer wall and extending therebetween for forming parallel passageways from said duct, and
   fastener means for supporting said plurality of panels relative to the outer skin,
   said rib means being formed of pairs of ribs integrally formed with each said inner and outer walls and said pairs of ribs converging toward each other and forming a trapezoidal passageway with said inner and outer wall for strengthening said panel.

4. A panel liner assembly for use in lining the exterior of a ventilated vehicle having a cargo disposed therein for transportation and an outer skin enclosing said cargo, said liner assembly comprising;
   a plurality of panels formed of an extruded material interconnected at outer edges thereof,
   each of said plurality of panels having a backing wall and a plurality of parallel ducts integrally formed with said backing wall and disposed between generally open surface spaces on said backing wall,
   said open spaces being disposed generally vertically and inwardly of the outer skin and coacting with the cargo to form ducts for directing cooling fluid between the floor and ceiling of the vehicle,
   each of said ducts further directing cooling fluid between the floor and ceiling and including a pair of side walls converging inwardly of the vehicle and a member connecting said side walls for forming said ducts in a trapezoidal configuration, and
   fastener means connecting said interconnecting means of adjacent panels including means supporting said plurality of panels relative to the outer skin.

5. A container for an over-the-road vehicle comprising;
   an outer metallic skin enclosing the interior of the vehicle,
   a plurality of spaced, generally vertically disposed posts attached to said skin for rigidizing said skin,
   foamed means disposed adjacent said skin and between said posts for thermally insulating the interior of the vehicle from the exterior thereof,
   a plurality of panels formed of an extruded material interconnected at outer edges thereof,
   each of said plurality of panels having an inner wall and an outer wall spaced therefrom forming a duct therebetween for directing a cooling fluid between the ceiling and floor of the vehicle,
   rib means integrally formed with said inner and outer wall and extending therebetween for forming parallel passageways from said duct, and
   fastener means for supporting said plurality of panels relative to the outer skin.

6. A container for an over-the-road vehicle comprising;
   an outer metallic skin enclosing the interior of the vehicle,
   a plurality of spaced, generally vertically disposed posts attached to said skin for rigidizing said skin,
   foamed means disposed adjacent said skin and between said posts for thermally insulating the interior of the vehicle from the exterior thereof,
   a plurality of panels formed of an extruded material interconnected at outer edges thereof,
   each of said plurality of panels having a backing wall and a plurality of parallel ducts integrally formed with said backing wall and disposed between generally open surface spaces,
   said open spaces coacting with a cargo and said ducts for directing cooling fluid between the floor and ceiling of the vehicle,
   each of said ducts including a pair of side walls converging inwardly of the vehicle and a member connecting said side walls for forming said ducts in a trapezoidal configuration, and
   fastener means connecting said interconnecting means of adjacent panels including means supporting said plurality of panels relative to the outer skin.

7. A panel liner assembly for use in lining the exterior of a ventilated vehicle having an outer skin comprising;
   a plurality of panels formed of an extruded material interconnected at outer edges thereof,
   each of said plurality of panels having an inner wall and an outer wall spaced therefrom forming a duct therebetween for directing a cooling fluid between the ceiling and floor of the vehicle,
   rib means integrally formed with said inner and outer wall and extending therebetween for forming parallel passageways from said duct, and
   fastener means for supporting said plurality of panels relative to the outer skin,
   said plurality of panels including an upper edge of said inner wall being formed vertically spaced from the edge of said outer wall for exposing a portion of a surface of said outer wall and facilitating the connection of said fastener means to said outer wall.

References Cited by the Examiner
UNITED STATES PATENTS
3,206,946  9/1965  Lindersmith _____ 98—6 X MEYER PERLIN, *Primary Examiner.*